C. H. McCLAIN & D. L. BUREN.
FILM SHIFTER FOR CAMERAS.
APPLICATION FILED SEPT. 2, 1916.
1,288,078.
Patented Dec. 17, 1918.
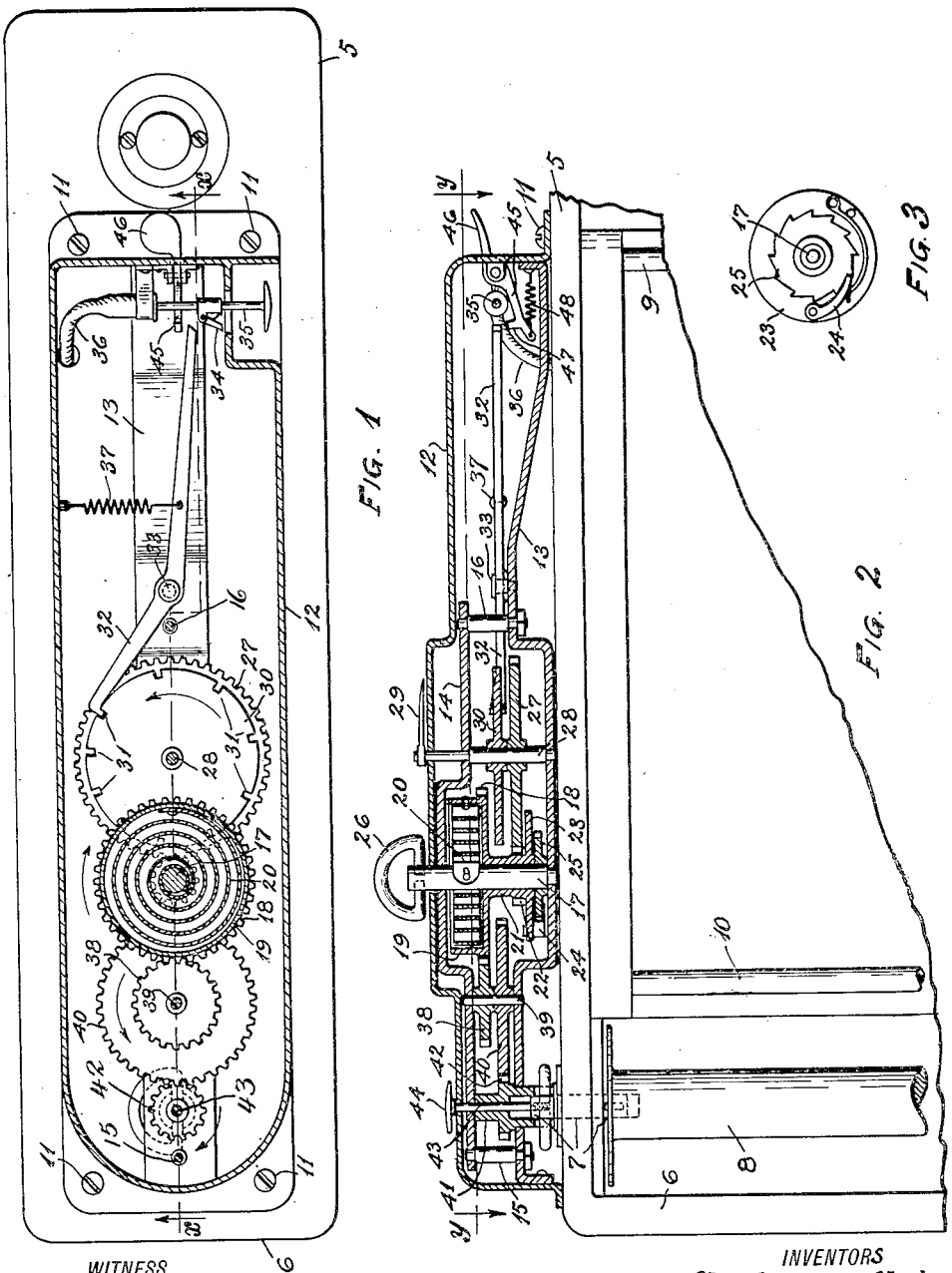
WITNESS
O. Johnson
INVENTORS
Charles H. McClain
Daniel L. Buren
BY
C. D. Hawkins
ATTORNEY

UNITED STATES PATENT OFFICE.

CHARLES H. McCLAIN AND DANIEL L. BUREN, OF BREMERTON, WASHINGTON.

FILM-SHIFTER FOR CAMERAS.

1,288,078.   Specification of Letters Patent.   Patented Dec. 17, 1918.

Application filed September 2, 1916. Serial No. 118,239.

*To all whom it may concern:*

Be it known that we, CHARLES H. MC-CLAIN and DANIEL L. BUREN, citizens of the United States, residing at Bremerton, in the county of Kitsap and State of Washington, have invented a certain new and useful Improvement in Film-Shifters for Cameras, of which the following is a specification.

Our invention relates to improvements in cameras which are adapted to expose successive sections of sensitized films to the action of photographic lenses in the operation of making photographs, and the object of our invention is to provide a mechanical device which shall be adapted to be detachably associated with the operative parts of any one of different well known forms of cameras, and which shall be capable of operating automatically to move successive sections of a film in such camera, one section at a time, from a roller to a position for exposure to the action of a lens and thence on to another roller only in response to successive operations of the mechanism which controls the shutter of said lens, whereby there shall always be an unexposed section of film opposite the lens and whereby a section of the film cannot be exposed twice.

We accomplish this object by devices illustrated in the accompanying drawing wherein Figure 1 is a sectional view on broken line *y, y* of a structure embodying our invention as it appears when attached to a side of a camera of well known form; Fig. 2 is a sectional view of the same on broken line *x, x* of Fig. 1; and Fig. 3 is a side view of details of the same.

Referring to the drawings, throughout which like reference numerals indicate like parts, 5 designates a side wall and 6 designates an end wall of the inclosing case of a well known form of camera, a fragmentary view of which inclosing case, with its cover removed, is shown in Fig. 2.

Rotatably disposed to extend through the wall 5 at a point near the end wall 6 is a spindle 7, as indicated by dotted lines in Fig. 2, which spindle 7 is adapted, in a well known manner, to be moved inwardly and outwardly to engage and disengage one end of a spool 8, whereby when said spindle 7 is engaged with said spool 8 then said spool 8 may be rotated by revolving the spindle 7, by means hereinafter described, to wind upon it a film, not shown, which may extend from another spool, not shown, over a roller 9 and a roller 10 thence as required to dispose successive sections of it to rest for an exposure to the action of a photographic lens, not shown, that may be disposed in the usual manner with its axis at a point midway between said rollers 9 and 10.

Detachably secured by screws 11 to the outer side of the side wall 5 is a metal casing 12 within which is contained two spaced frame plates 13 and 14 which are rigidly connected together by studs 15 and 16, the plate 13 being securely fastened at its opposite ends to the inner surface of the respective end walls of said metal casing 12, within which frame plates 13 and 14 is rotatably disposed the winding shaft 17 of a well known form of a clock-spring-actuated gearwheel 18 that is integral with a spring-box 19 within which is a clock-spring 20 whose inner end is connected to the winding shaft 17 and whose outer end is connected with the cylindrical wall of the spring-box 19.

Integral with the gearwheel 18 is a sleeve 21 which is provided with a pinion 22 and an integral disk 23 which is provided with a pawl 24 that operatively engages with the teeth of a ratchet wheel 25 that is fastened on to the adjacent end portion of the shaft 17 whose other end portion projects outwardly through the metal casing 12 where it is provided with a finger-hold 26 which may be manipulated to wind the clock-spring 20 which in a well known manner will then impart force to the gearwheel 18 that tends to rotate said gearwheel 18.

Operatively engaging with the teeth of the pinion 22 is a gearwheel 27 which is rigidly mounted on a shaft 28 which is rotatably mounted in the frame plates 13 and 14 and one end portion of which projects outwardly through the metal casing 12 where it is provided with a pointer 29.

Also rigidly mounted on the shaft 28 is a disk 30 which is provided with a plurality of unequally spaced notches 31 into which the hook-like end of a detent lever 32 may fall at required times to prevent the rotation of the shaft 28 and its wheel 27, said detent lever 32 being pivotally supported near the center of its length on the plate 13 by a pivot 33, the other end of said lever being adapted to engage with a detent 34 that is pivoted on a plunger 35 which in a well known manner may be actuated to move a flexible rod, not shown, which extends through a flexible tube 36 to operate a shutter controlling mechanism associated with a photographic lens not shown.

Thus when the plunger 35 has been forced inwardly to open the shutter to expose a section of film, then, when said plunger 35 is released it will move outwardly to cause the detent 34 to make momentary engagement with the end of the lever 32 to swing such lever 32 in an obvious manner against the force of a retractile spring 37 to disengage the hooked end of said lever 32 from a notch 31 to permit the disk 30 and its shaft 28 to revolve, and when said plunger 35 has reached its outermost position the lever 32 will swing back in response to the force of the spring 37 to cause its hooked end to rest on the periphery of the disk 30 ready to fall into the next notch 31 when said disk 30 has rotatively moved for a distance to cause such next notch 31 to register with the hooked end of said lever 32, thus to stop the rotary movement of the disk 30 and its shaft 28 until the plunger 35 is again actuated to operate the shutter.

Engaging with the teeth of the gearwheel 18 that is integral with the spring-box 19 is a gearwheel 38 having half the number of teeth of the gearwheel 18, and said gearwheel 38 is rigidly mounted on a shaft 39 that is rotatably disposed in pivot holes in the plates 13 and 14 and upon said shaft 39, adjacent to the gearwheel 38, is rigidly mounted a larger gearwheel 40 having twice as many teeth as the gearwheel 38.

Operatively coupled with the spindle 7 is a sleeve 41 which extends through the plate 13 and which is provided with integral gearteeth 42 which engage with the teeth of the gearwheel 40, there being one third as many teeth on said sleeve 41 as there are on the gearwheel 40, thus, the sleeve 41 and the spool 8 will revolve six times in response to one revolution of the gearwheel 18.

Extending through the sleeve 41 and through the plate 14 and metal casing 12 is a plunger 43 provided with a knob 44, which plunger 43 is attached to the outer end of the spindle 7 whereby the spindle 7 may be moved outwardly for sufficient distance to disengage its inner end portion from the spool 8 in the operation of removing said spool 8 from the inclosing case when all of a film has been mounted thereon.

The operation of the mechanism may be described as follows: A spool of sensitized photographic film is disposed in the usual manner in one end of the inclosing case adjacent to the roller 9 and the outer end portion of the film is unwound to extend it over the roller 9, thence to and over the roller 10, thence to the empty spool 8 to which such end portion is attached and thereupon the cover of the inclosing case is replaced in its normal position, then the clock-spring 20 is wound up whereupon the plunger 35 is pressed inwardly and released, thus to actuate the lever 32 to release the disk 30 to permit such disk 30 and the train of wheels to revolve during the time that said disk 30 travels in the direction of the arrow from one notch 31 to the next notch 31, thus to rotate the spool 8 to wind up the inactive end portion of the film and to place in position before the lens the first active section of said film where it will be ready for exposure.

Then, when it is desired to photograph an object the plunger 35 is actuated to open the shutter and upon its release it will incidentally cause the detent 34 to swing the lever 32 to unlock the disk 30, whereupon the disk 30 will move to the next notch and the spool 8 will be rotated to wind upon it the exposed section of the film and bring another unexposed section opposite the lens ready for the next picture which in like manner may be taken by again pressing the plunger 35 when the same cycle of operations will be repeated.

Obviously, when the spool 8 is nearly full one revolution of it will wind a longer portion of a film on to it then when it is nearly empty and in order to make it revolve a greater number of times when it is nearly empty than when it is nearly full we have disposed the notches 31 on the disk 30 at different distances between different adjacent ones, as shown more clearly in Fig. 1, whereby when the spool 38 is nearly empty the train of wheels will be permitted to move for a longer time to rotate the spool 8 a greater number of times, and when the spool 8 is nearly full the distance between adjacent ones of the notches 31 will be shorter so that the spool 8 will revolve a less number of times to wind up the same length of film that would be wound up when said spool 8 is nearly empty.

In order to make time exposure we have provided a pivoted lever 45 one end portion of which projects outwardly through the metal casing 12 where it is provided with a knob 46 which may be actuated by one's finger, while its other end portion is provided with a lug 47 and a retractile spring 48, which lug 47 is adapted to engage with the detent 34, when the knob 46 is depressed, to prevent the detent 34 from engaging with the end of the lever 32 upon the outward movement of the plunger 35, thus, when it is desired to make a time exposure the knob 46 is first depressed, then the plunger 35 is pressed inwardly to open the shutter and immediately released while the knob 46 is still depressed, thus, to prevent a movement of the lever 32, then said knob 46 is released, and after the required time for exposure has elapsed, then the plunger 35 is again pressed inwardly to close the shutter and upon its release the outward movement of said plunger 35 will cause the detent 34 to actuate the lever 32 to set the train of wheels in motion to turn the spool 8 thus to bring another unexposed section of the film opposite the lens.

Obviously, upon every exposure of the film a new section of it will be placed in position and it is impossible to make a double exposure on the same section of such film.

Manifestly, the metal casing 12, with the mechanism contained therein, is adapted to be attached quickly to any of a number of different types of cameras that are already commercially sold and used.

Changes may be made in the forms, dimensions and arrangement of parts of our invention without departing from the spirit thereof.

What we claim is:

1. An automatic film shifter for cameras including a spring motor adapted to be secured to one side wall of a camera casing at a point between the ends thereof, gearing operatively arranged at one side of said motor to communicate motion therefrom to the winding roll of the camera, a shaft arranged at the opposite side of said motor and geared thereto, a notched disk carried by said shaft, a spring pressed detent having one end adapted to normally engage in one of the notches of said disk to hold said motor from operation and having its other end extended to a point adjacent the end of the camera casing opposite to that in which the film winding roll is journaled and adjacent the shutter actuator of the camera, means carried by the shutter actuator to actuate said detent and thereby release the motor when the shutter actuator returns to normal position, and means to render the detent actuating means inoperative.

2. In an automatic film shifter for cameras, the combination with an automatic winding means for a film winding roll having an escapement mechanism to control the same including a pivoted spring pressed detent having one end arranged adjacent the shutter actuator of the camera, of a pawl carried by said shutter actuator and arranged to release the detent when the actuator returns to normal position, and a lever to render the pawl inoperative.

In witness whereof, we hereunto subscribe our names this 25th day of August A. D., 1916.

CHARLES H. McCLAIN.
DANIEL L. BUREN.

Witnesses:
FRANK WARREN,
WILLIAM B. CARR.